United States Patent [19]

Blunt et al.

[11] 4,045,380

[45] Aug. 30, 1977

[54] CELLULAR MATERIAL

[75] Inventors: Geoffrey Vincent Dallow Blunt; Newton John Hodges; Robert James Pragnell, all of Cheltenham, England

[73] Assignee: Coal Industry (Patents) Limited, London, England

[21] Appl. No.: 547,061

[22] Filed: Feb. 13, 1975

Related U.S. Application Data

[63] Continuation of Ser. No. 345,574, March 28, 1973, abandoned.

[30] Foreign Application Priority Data

Apr. 6, 1972 United Kingdom ............... 15940/72

[51] Int. Cl.$^2$ ............................. C08J 9/06; C08L 9/00
[52] U.S. Cl. ...................... 260/2.5 HA; 260/28.5 AS; 260/42; 260/42.25; 260/42.32; 260/42.37; 260/724; 260/758
[58] Field of Search .................... 260/2.5 H, 28.5 AS, 260/724, 758

[56] References Cited

U.S. PATENT DOCUMENTS

| | | | |
|---|---|---|---|
| 2,271,498 | 1/1942 | Overstreet | 260/724 |
| 2,404,171 | 7/1946 | Hamilton | 260/724 |
| 2,807,596 | 9/1957 | Flickinger | 260/28.5 B |
| 3,354,105 | 11/1967 | Trieschock | 260/28.5 AS |

*Primary Examiner*—Wilbert J. Briggs, Sr.
*Attorney, Agent, or Firm*—James C. Wray

[57] ABSTRACT

A cellular material may be made by vulcanizing a mixture containing between 15% and 50% of an eboniteforming rubber and sufficient vulcanizing agents to form an ebonite with the rubber, between 5% and 87% of a coal digested in pitch, tar or tar oil, between 10% and 40% of a particulate filler and a chemical blowing agent, whereby an ebonite structure is formed, so that, during the vulcanization, the chemical blowing agent decomposes or reacts to produce a gas, the viscosity of the composition during the production of the gas increasing whereby cells are retained in the composition. The digested coal has a penetration, converted to a Ring and Ball softening point of 85° C, of between 10 and about 45. Cellular plastics material produced by this process may contain at least 25% by volume of closed cells.

10 Claims, No Drawings

CELLULAR MATERIAL

This is a continuation, of application Ser. No. 345,574 filed 3-38-73, now abandoned.

This invention relates to a cellular material. In particular it relates to cellular materials containing bituminous substances.

It has previously been proposed to produce cellular materials containing bituminous materials. Such cellular materials have been formed by the reaction of a substance having at least two isocyanate groups, which substances are hereinafter known as polyisocyanates, and the bituminous material and the concurrent or subsequent foaming of the reacted produce to form a cellular material. The blowing or foaming agent is often the carbon dioxide formed by the reaction of water with the polyisocyanate, or the reaction of the polyisocyanate with the bituminous material.

It has also been proposed to form cellular materials by the admixture of an aqueous dispersion of a bituminous material and an aqueous dispersion of a rubber, foaming the mixture, and curing the cellular structure so formed. This prior proposed process results in the formation of flexible open celled cellular materials. The open cells are formed at least during the heating required for curing the rubber.

The present invention enables rigid cellular materials to be manufactured containing bituminous materials and having a substantially closed cell structure. The cellular materials are relatively strong but the bituminous material enables a relatively low cost product to be made.

Accordingly the invention provides a process for the production of a cellular material by vulcanising a composition containing between 5% and 87%, preferably at least 20% and less than 70%, of a bituminous material, and between 10% and 90% on an ebonite-forming rubber, and preferably at least 15% and less than 50% of the rubber, and sufficient vulcanising agents to form an ebonite with the rubber, not more than 10% of a solid filler, and a chemical blowing agent, whereby an ebonite structure is formed, wherein, during the vulcanisation, the chemical blowing agent decomposes or reacts to produce a gas, the viscosity of the composition during the production of the gas increasing whereby closed cells are retained in the composition.

The invention includes also a foamable plastics composition containing between 5% and 87%, preferably at least 20% and less than 70%, of a bituminous material, and between 10% and 90% of an ebonite-forming rubber, and preferably at least 15% and less than 50% of the rubber, and sufficient vulcanising agents to form an ebonite with the rubber, not more than 10% of a solid filler, and a chemical blowing agent.

The invention further includes a cellular plastics material containing between 5% and 87%, preferably at least 20% and less than 70%, of a bituminous material, and between 10% and 90% of an ebonite matrix, and preferably at least 15% and less than 30% of the ebonite matrix, and not more than 10% of a solid filler and including at least 25% by volume and preferably at least 60% by volume, of closed cells.

Any bituminous material may, in principle, be employed in the present invention. The term "bituminous material" is a very wide generic term used for substances having relatively few chemical properties in common. Bituminous materials include the heavy ends from the fractionation of petroleum products, which are known in England as "bitumen" and in America as "asphalt", such materials being hereafter referred to as "bitumen". It will be understood, however, that there may be compatibility problems between bitumen and the rubber employed, at least in certain proportions. It is often preferred to employ, as the bituminous material, materials derived from coal. These materials include coal tar and coal tar pitches, both of which are volatile materials formed during the destructive distillation of coal, either in the formation of coke or in the formation of combustible gases.

A particularly suitable bituminous material is coal digest which is the product formed by the treatment of coal with a pitch, tar, high-boiling oil or other solvent at an elevated temperature, for example 300° C to 450° C, whereby the coal, or as much thereof as is practical to dissolve, is dissolved in the pitch, tar, oil or other solvents. The coal is not present as a discrete phase, as is the case when the coal is suspended in the pitch, tar, oil or other solvent but is present in solution either as itself or in a solvolysed form.

It has been suggested that a coal digest may comprise a two phase system including the pitch, tar, oil, or other solvent in which partially solvolysed coal is suspended. Insofar as the present invention is concerned, such a suspension is a permanent one and the coal digest may be considered as a single phase system. It is believed that the coal digest may be partly colloidal.

There will be a certain proportion of the coal, mostly ash, which will be insoluble in the pitch, tar, oil or other solvent. This proportion may be filtered off. The coal digest may be considered as a solution or extract of coal. It may be unnecessary to filter off the insoluble matter for purposes of the present invention as the insoluble matter, which will be finely divided, may be considered as a filler. It may be undesirable to employ a coal digest from a highash coal unfiltered.

The properties of the coal digest may be varied by varying the coal, the pitch, tar, oil or other solvent employed, the relative quantities thereof and other conditions, particularly temperature, of its formation.

It may be convenient, particularly if a flexible or low density cellular material is to be produced, to employ an oil-extended coal digest having a needle penetration index, converted to a Ring and Ball softening point of 85° C, of at least 10, and preferably at least 15.

A relatively high needle penetration index of the coal digest may often be preferred in principle. However, it has been found that coal digests having needle penetration indices of above 25, converted to a softening point of 85° C, are difficult to manufacture. A needle penetration index of up to about 45, converted to a softening point of 85° C, would be particularly suitable.

The coal digest may be extended with an oil or tar compatible with the coal digest and such digest is known herein as an oil-extended coal digest. For a coal digest having a softening point of about 85° C, it may be convenient to add between 0.25 and 1 parts preferably between 0.25 and 0.50 parts of oil or tar to each part of the coal digest.

The coal digest, when extended with the oil or tars, will generally have a density at 25° C of between 1,175 and 1,190 kg/m³, and the density should preferably be between 1,180 and 1,185 kg/m³.

The needle penetration index of a material is that distance that a standard needle penetrates vertically into a sample of the material under fixed conditions of loading, time and temperature. The method used herein is that of Institute of Petroleum Standard method of testing IP 49/67, which is believed not significantly to differ from the A.S.T.M. D5 method. In this method the needle penetration index is that distance, measured in tenths of a millimeter, that the standard needle penetrates into the samples when applied thereto for 5 seconds by means of a penetrometer under a load of 100g and at 25° C.

Any extension of the coal digest with oil or tar will involve the variation of both the softening point and the needle penetration index of the coal digest. Accordingly, the needle penetration index specified for the purposes of this invention must be taken with reference to a particular softening point of coal digest, 85° C. In respect of coal digests having softening points other than 85° C the softening point must be converted to 85° C before the needle penetration index is measured. If the softening point of the coal digest is below 85° C, the coal digest is distilled in the inert atmosphere or in vacuo to remove low boiling impurities. If the softening point of the coal digest is above 85° C, oil or tar extender is added to diminish the softening point to 85° C. In each case the distillation or addition is continued until the softening point is 85° C. The value of the needle penetration index of this product, having the 85° C softening point, is the needle penetration index, converted to a softening point of 85° C, of the original coal digest. Any extender employed should desirably be that, if any, to be employed to extend the coal digest for use in the present invention. If no extender is to be employed to extend the coal digest, the oil or tar extender should have an immeasurably large needle penetration index (over 500) under the standard conditions so that it does not contribute substantially to the converted needle penetration index of the coal digest.

The needle penetration index may be measured with the coal digest containing such portions of matter as is contained in the coal as is insoluble therein and which, as is described, may be considered as a filler. However, the needle penetration index should not be measured in the presence of additional filler.

The bituminous material may, in general, be extended with a fluxing oil or the like. Such oils are known in general, in relation to particular bituminous materials for which they are suitable. Such extended materials will have a lower softening point than the unextended bituminous materials. These may give to the composition to be foamed a softening point undesirably lowered. In each case the amount of fluxing oil to be employed will be a matter for those of skill in the art of formulation. For bitumens, typical fluxing oils are naphthenic hydrocarbon fractions. For materials of coal origin, typical fluxing oils are aromatic hydrocarbon fractions.

Any ebonite-forming natural or synthetic rubber may be employed, provided that it is sufficiently compatible with the bituminous material. The degree of compatibility required will depend upon the particular circumstances and is a matter for simple experiment.

The synthetic rubbers that form ebonites are, in general, those formed by the polymerisation of conjugated dienes. The formation of the ebonite matrix is by the cross-linking of the unsaturated groups in the polymer chain with a vulcanising agent, usually sulphur, so that as many as possible of such unsaturated groups are cross-linked. The typical synthetic rubbers that form ebonites are polymers, including copolymers, of butadiene and its homologues. Preferred copolymers of butadiene are with acrylonitrile and/or styrene. Other rubbers of this type are isoprene rubbers and chloroprene rubbers (polychlorobutadiene). However, as chloroprene rubber is noted for its flexibility, the ebonite formed therefrom is relatively flexible and its use is not preferred. Natural rubber is a polyisoprene and forms an ebonite.

The natural vulcanising agent to be employed in the manufacture of ebonite is sulphur. Ebonite is characterised in that the vulcanisation of the rubber is carried out so that as many as possible of the unsaturated groups contained in the unvulcanised rubber are cross-linked, and so that the ebonite product becomes rigid and inextensible. The amount of vulcanising agent required for this varies with the rubber but is generally at least 25 parts by weight per hundred parts of the rubber (p.h.r), of sulphur. In general, less than 50 p.h.r. will be used.

Accelerators and other additives will normally be employed in the rubber, in general accord with ebonite or vulcanised rubber manufacturing practice. Typical accelerators include N,N'-diphenylthiourea N,N'-di-o-tolyl-guanidine, 2-mercaptobenzthciazole, tetramethylthiuram disulphide, tetramethylthiuram sulphide, zinc diethyldithiocarbonate, zinc 2-mercaptobenzthiazole, zinc ethylphenyldithiocarbonate, zinc iso-propylxanthate and sodium iso-prepylxanthate. Typical anti-oxidants and anti-ozonants that they may be employed include N-phenylnaphthylamines, di-t-butyl-p-cresol, and N,N'-diphenyl-p-phenylenediamine.

By "chemical blowing agent" is meant those blowing agents which comprise compounds or mixtures which react or decompose to produce a gas which forms the cells in the cellular material. This does not include those volatile low molecular weight substances which are liquid at ambient temperature but which are gases at the temperature at which the ebonite is formed. Chemical blowing agents include sodium bicarbonate and ammonium bicarbonate, if appropriate in the presence of an organic acid, and azo compounds which decompose to give nitrogen on heating, for example 2,2'azodiisobutyronitrile, benzenedisulphonhydrazide, di(4-benzenesulphenhydrazide)ether and azodicarbonamide.

The amount of blowing agent employed will depend on the desired density of the cellular material. Cellular materials including over 60% or 80% by volume of cells may often be made.

Surface active agents, for example silicones, may be employed to promote a uniform fine cell structure. Other additives may also be used. In each case, careful regard must be had to the desired properties.

It may often be convenient to employ fire retardent substances in the cellular practices material. Fire retardant substances that may be employed are, in general, those that are used in the art of the rubber employed. Examples of such fire retardant substances include brominated organic compounds and antimony trioxide, the latter generally in conjunction with a further fire retardant substance, for example ammonium fluoroborate, dichlorane and chlorinated waxes.

In some cases it may be desired to employ a particulate filler, in order to improve the impact resistance or other properties of the cellular plastics composition or in order to diminish the cost thereof. However, the presence of a particulate filler in the cellular plastics composition may mean a deterioration in certain properties, for example abrasion resistance and coil structure, the latter particularly because the size of the filler will often be significant in comparison with the size of the cell walls. It is therefore desirable that only small quantities of filler, preferably less than 5%, should be employed.

The filler should preferably be finely divided, but it will be understood that, for various purposes, the particle size of the filler may be varied. It is not necessary to have a purely particulate filler, and the filler may include shredded natural or synthetic organic or inorganic fibres. If fibres or large particles are present it may be more difficult to foam the plastics composition evenly. Other suitable fillers include clays, including china clay and kaolin, shales, calcium carbonate, fly ash, silica, carbon black and sawdust.

The foamable plastics composition is thoroughly mixed so that any solids are dispersed therein, and the bituminous material and the rubber are mutually dispersed. It is generally unsatisfactory to employ emulsions of the rubber and of the bituminous material, as the water will need to be removed and the foamable plastics composition reworked before the composition is foamed. This is, at least in part, because of the relatively high temperatures required for ebonite formation. The foamable plastics composition may advantageously be callendered to produce a sheet.

The foamable plastics composition is after such mixing heated so that the rubber is partially vulcanised. The partial vulcanisation is advantageously carried out at such a temperature that the chemical blowing agent does not substantially decompose or react to produce gas, and to such an extent that the viscosity of the foamable plastics composition at the blowing temperature increases, with increasing amount of cure. The partially vulcanised mixture, or the foamable plastics composition, is heated to the blowing temperature, which is above the temperature at which the blowing agent decomposes or reacts to produce gas. The blowing agent decomposes while the rubber is vulcanised. The vulcanisation of the rubber increases its strength so that the cells are retained therein. In order to produce closed cells it is generally necessary to ensure that the viscosity and the strength of the mixture is sufficiently high that the cell walls do not rupture once the cells have been formed.

After the cells have been formed the vulcanisation is continued, if desired at an increased temperature, until an ebonite matrix is formed. The cells and cell walls will not normally substantially alter in shape and size between the initial partial vulcanisation when the cells have been formed. The extent of the formation of the ebonite is a matter of choice having regard to the economics of production of the cellular material. It is known in general to be difficult to manufacture a completely cross-linked ebonite structure, and it is not normally necessary completely to cross-link the rubber.

The exact heating procedure and the time of heating will depend on the chemical blowing agent, and the composition of the foamable plastics composition. It is not possible to indicate any method of choosing a chemical blowing agent in conjunction with any particular heating procedure. This will be a matter of experiment, and it is normal practice for one of ordinary skill in the art of cellular material manufacture, and in particular of cellular rubber manufacture, to conduct such experiments and to select heating procedures and blowing agents in order to produce cellular materials of desired cell structure and density. The use of the term "cell structure" includes not only the proportion of cells that are closed but also the size and evenness of the individual cells.

In the manufacture of the ebonite, it is generally necessary to employ a vulcanising temperature of at least 120° C, and a temperature of at least 150° C is usual. It is not normal to employ a vulcanising temperature in excess of 200° C.

During the ebonite formation, or after the cells have been formed, temperatures of between 160° C and 180° C are normal. The temperatures may advantageously gradually be raised during the cell formation, until it reaches a temperature suitable for the formation of the ebonite.

One advantageous method of forming a cellular material is to introduce the foamable plastics material, shaped as required, for example in the form of a callendered sheet, into the mould cavity of a closed mould, the mould then being heated to heat the foamable plastics material, if necessary partially to vulcanise the rubber, and to cause the blowing agent to decompose or react to form the cells. The foamable plastics material may advantageously be partially vulcanised before it is inserted into the mould cavity. Once the cells have been formed and stabilised, the cellular material can advantageously be removed from the mould and thereafter the vulcanisation can be continued until the ebonite is formed.

According to a modification of the foregoing invention there is provided a further process for the production of a cellular material which comprises foaming a composition containing between 5% and 90%, preferably at least 20% and less than 70% of a coal digest and between 10% and 90%, of a thermosettable resin system other than an epoxy resin, compatible with the coal digest in the proportion employed and preferably at least 15% and less than 50% of the thermosettable resin system, and less than 10% of a finely divided filler, and preferably in the substantial absence of any added filler, and curing the thermosettable resin to retain cells in the cured composition.

A foammable composition for use in this method contains between 5% and 90%, preferably at least 20% and less than 70% of coal digest, and between 10% and 90% of a thermosettable resin system other than an epoxide resin compatible with the coal digest in the proportion employed, and preferably at least 15% and less than 50% of the thermosettable resin, and less than 10% of a finely divided filler, and preferably in the substantial absence of any added filler, and a blowing agent.

A cellular plastics material that can be prepared by this method contains between 5% and 90%, preferably at least 20% and less than 70%, of coal digest, and between 10% and 90% of a thermoset resin other than an epoxide resin compatible with the coal digest in the proportion employed, and preferably at least 15% and less than 50% of the thermoset resin, and less than 10% of a finely divided filler, and preferably in the substantial absence of any added filler, and includes at least 60% by volume, and preferably at least 80% by volume of cells.

The blowing agent that may be employed in this modification may be the chemical blowing agent hereinbefore described. However any suitable blowing agent may be employed in order to form the cells in the cellular plastics material, provided that the active substance does not dissolve in the coal digest with the result that no cells are formed. Volatile low molecular weight organic substances having, preferably, not more than four carbon atoms, may, in principle, be employed, but they are particularly subject to the solubility criterion. Examples of such substances include halogenated hydrocarbons, for example chlorinated hydrocarbons, fluorinated hydrocarbons, and chlorofluorinated hydrocarbons, as well as hydrocarbons, for example propane and butane.

The blowing agent may be a substance that reacts with the thermosetting system or be a component of the thermosetting system. For example, if the thermosetting system includes a polyisocyanate, the polyisocyanate reacts with water to form carbon dioxide and an amine, which carbon dioxide forms the cells.

Alternatively, gases, for example air, carbon dioxide or nitrogen, can be whipped, or otherwise entrained, into the plastics composition to be foamed.

The thermosettable system employed should be sufficiently compatible with the coal digest in order that the thermosettable system can be thoroughly mixed with the coal digest. The suitability can be determined by simple experiment. Suitable thermosettable systems include aldehydic resins, including hydrocarbon-formaldehyde resins, for example xylene-formaldehyde resins and naphthalene-formaldehyde resins, furane-formaldehyde resins, phenol-formaldehyde resins, furfural resins, amine resins, for example melamine-formaldehyde resins and urea-formaldehyde resins and alkyd resins, which are polyesters derived from at least a portion of compounds having either more than two hydroxyl groups or more than two carboxylic and groups.

The preferred thermoset resin is a polyurethane, which is formed by the reaction of a polyisocyanate with a compound having at least two alcololic hydroxyl groups or amino N-H groups hereinafter referred to as isocyanate-reactive groups. The polyisocyanates that are employed are those used in the manufacture of polyurethane cellular materials. These are generally the aromatic polyisocyanates, and it is normal to employ mixed polyisocyanates. Such mixed polyisocyanates generally comprise mixed diisocyanates with a relatively small proportion of triisocyanates. Examples of diisocyanates that may be employed are the diisocyanatotoluenes, di(4-isocyanatophenyl)methane, 1,3-diisocyanatobenzene, 1,4-diisocyanatobenzene, diisocyanatonaphthalenes, 4,4'-diisocyanatodiphenyl, di(4-isocyanatophenyl)ether, and di(isocyanatocyclohexyl) methane. Polyisocyanates having more than two isocyanate groups that may be employed include 2,4,6-triisocyanatotoluene, and (2,4,4'-triisocyanato)-diphenyl ether. A particularly suitable group of polyisocyanates which are reported to impart fire resistant properties to the cellular materials are the isocyanurates, which are formed by the trimerisation of isocyanate groups and have a

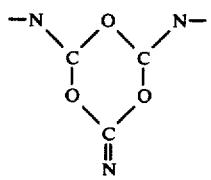

2,4,6-triimino-1,3,5-trioxane ring structure. Such isocyanurates are formed by the trimerisation of the diisocyanates referred to above.

The compounds that have at least two isocyanate-reactive groups may be monomeric or polymeric. Particularly suitable polymers are polyesters, polyesteramides and polyethers. Polyesters may be of the kind formed by the reaction of a compound having a plurality of hydroxyl groups or the ester forming derivatives thereof with a compound having a plurality of carboxylic acid groups or the ester forming derivatives thereof. Such compounds include ethylene glycol, diethylene glycol, glycerol, trimethylol propane, pentaerythritol, adipic acid, phthalic acids, trimellitic acid and pyromellitic acid. Polyethers may be derived, for example, from ethylene oxide or propylene oxide by reaction with a compound having a plurality of hydroxyl groups. Polyesteramides are analogous to polyesters, but employing a proportion of amines, in place of the alcohols, for example ethanolamine. There may also be present other compounds used in the manufacture of polyurethane cellular materials, for example basic compounds which may act as catalysts, including potassium acetate, triethylamine, triethylene diamine and N-alkylpyrrolidines.

Any suitable conventional technique of foaming or blowing and setting the resin may be employed to form the cellular plastics material according to this modification of the invention. The foamable plastics composition may be introduced into a closed mould which is then heated so that the blowing agent produces cells and expands the foamable plastics composition to fill the mould while concurrently curing the resin. The cellular plastic material may also be formed by the free-blown process, in which the components of the foamable composition are mixed and, if appropriate, heated, and the foamable composition foams and cures.

According to a further modification of the invention, in the manufacture of the cellular material having the ebonite structure and the foamable composition therefor, in conjunction with the coal digest having a penetration, converted to a Ring and Ball softening point of 85° C, of at least 10, in excess of 10% and less than 40% of the finely divided particulate filler may be employed.

The following non-limitative examples illustrate the invention.

EXAMPLE 1

For each of the following formulations the constituents are milled together on a two-roll mill and then moulded. The moulded product is heated in a closed mould to 170° C for 30 minutes at which temperature the blowing agent decomposes and the rubber vulcanises. A cellular plastics material having the density indicated below is formed. Formulations 1 to 3 are rigid materials.

| Formulation | 1 | 2 | 3 |
| --- | --- | --- | --- |
| Coal tar pitch softening point 110° C | 69 | | |
| Coal tar pitch softening point 80° C | 55 | 77.3 | |
| Styrene-butadiene rubber | 20 | | 15 |
| Natural rubber | | 30 | |
| Sulphur | 7 | 10 | 5 |
| Azo blowing agent | 1 | 1 | 1 |
| Zinc oxide | 1 | 1.5 | 0.7 |
| Calcium oxide | 0.5 | — | — |
| Stearic acid | 1 | 1.5 | 0.7 |
| Di(benzothiazol-2-yl)disulphide | 0.5 | 1 | 0.3 |
| Density of product kg/m$^3$ | 220 | 260 | 400 |

EXAMPLE 2

For each of the following formulations, the constituents are blended together using internal mixers and two roll mills at below 100° C. The foamable compositions are sheeted on a calender and placed in a mould cavity. The mould is then heated for the time indicated and at the temperature indicated. The blowing agent decomposes to form cells and an ebonite is formed. The products have closed cells with low water absorption and thermal conductivity as shown from the following table, the properties being determined by British Standard methods.

The following are then added to the mixture and throughly mixed in:

Stannous octanoate: 0.5
Silicone surfactant: 0.5.

Finally, 8 parts of water are mixed in and the mixture is poured into a mould. The water reacts with the isocyanate groups forming carbon dioxide. A semirigid non-friable cellular plastics material having a density of 80 kgm$^3$ is formed.

| Type of Rubber | S.B.R. | Natural | Nitrile | Polybutadiene |
| --- | --- | --- | --- | --- |
| Rubber, % | 20 | 15 | 20 | 22 |
| Sulphur, % | 6 | 5 | 6 | 5 |
| Zinc oxide, % | 2 | 2 | 2.5 | 2 |
| Stearic acid, % | 0.8 | 0.4 | 0.6 | 0.5 |
| Dibenzthiazyl disulphide, % | 1.5 | — | 1.8 | 1.5 |
| Mercaptobenzthiazole, % | — | 0.4 | — | — |
| Benzene sulphonhydrazide, % | 3.0 | 2.0 | — | 3.5 |
| Di(4-benzenesulphonhydrazide)ether | — | — | 3.0 | — |
| Pitch (115–120° C R & B), % | balance | — | balance | balance |
| Coal digest (80° C R & B), % | — | balance | — | — |
| Cure temperature, ° C | 170 | 150 | 170 | 160 |
| Cure period, min. | 30 | 50 | 40 | 30 |
| Density (Kg/m$^3$) | 240 | 300 | 250 | 400 |
| Water absorption, % v/v after 1 week total immersion | 0.55 | 0.50 | 0.62 | 0.48 |
| Water vapour transmission (g/m$^2$s bar) | $0.5 \times 10^{-3}$ | — | — | — |
| Linear coefficient of Thermal expansion, 20° C, (per ° C) | $10.3 \times 10^{-5}$ | — | — | — |
| Thermal conductivity, at 20° C (Wm/m$^2$ ° C) | 0.043 | 0.050 | 0.045 | 0.068 |
| Tensile strength at 20° C kN/m$^2$ | 672 | — | — | — |
| Flexural strength at 20° C kN/m$^2$ | 1197 | 1300 | 1050 | 5020 |
| Compression strength at 20° C kN/m$^2$ | 980 | 1000 | 980 | 4200 |
| Impact strength at 20° C (g) | 0.03 | — | — | — |

SBR is a copolymer rubber of styrene and butadiene

EXAMPLE 3

For the following formulations as oil-extended coal digest was manufactured by digesting coal with a coal tar pitch at 300° C at atmospheric pressure, and was then extended with anthracene oil to give a coal digest having a Ring and Ball softening point of 85° C and a needle penetration index of 25.

The components of the formulations were milled together on a two-roll mill. After mixing, the formulations were moulded and heated to 170° C at which temperature the blowing agent decomposed and the rubber vulcanised to form an ebonite rigid cellular materials having closed cells. and densities indicated below were formed.

| Formulation | 4 | 5 |
| --- | --- | --- |
| Styrene-butadiene rubber | 20 | 10 |
| Zinc oxide | 2 | 1 |
| Stearic acid | 2 | 1 |
| Di(benzothiazol-2-yl)disulphide | 1 | 0.5 |
| Calcium oxide | 0.5 | 0.25 |
| Coal digest | 66.5 | 83.25 |
| Sulphur | 7 | 3 |
| Di(4-benzenesulphonhydrazide)ether | 1 | 1 |
| Density of cellular product kg/m$^3$ | 320 | 500 |

A mixture is formed from the following at slightly above ambient temperature:

Coal digest (as Example 3): 70
Bis(4-isocyanatophenyl)methane: 70
Strained anthracene oil: 25.

EXAMPLE 5

An isocyanurate formed by trimerising di(4-isocyanatophenyl) methane was employed in the manufacture of a cellular material, 60 parts of the isocyanurate, 20 parts of the cool digest (as Example 3) and 5 parts of trichlorofluoramethane were mixed together. 15 parts of a mixture of compounds having at least two hydroxyl groups per molecule and additionally containing catalysts and surfactants, which mixture is common to the art of polyurethane cellular materials, were mixed in with the cellular material so that the isocyanurate reacts exothermically with the mixture of compounds having at least two hydroxyl groups. The trichlorofluoromethane volatilises and a rigid cellular material having a density of 48 kg/m$^3$, a thermal conductivity of 0.035 Wm/m$^2$K and a substantially closer cell structure is formed.

EXAMPLE 6

A coal digest was manufactured by digesting coal with pitch at 300° C at atmospheric pressure and subsequently extending the product with anthracene oil to give a coal digest having a Ring and Ball softening point of 85° C and a needle penetration index of 25.

The following constituents were mixed on a two-roll mill:

| Formulation | 6 | 7 |
| --- | --- | --- |
| Styrene-butadiene rubber | 12 | 7 |
| Sodium bicarbonate | 4 | 4 |
| Sulphur | 4 | 2 |
| Stearic acid | 0.2 | 0.1 |

| -continued | | |
|---|---|---|
| Di(benzothiazol-2-yl)disulphide | 0.6 | 0.3 |
| Zinc oxide | 2 | 1 |
| Coal digest | 52.2 | 55.6 |
| Finely divided fly ash | 25 | — |
| Finely divided clay | — | 30 |

When thoroughly mixed, the mixtures were placed in closed moulds and heated at 175° C for 30 minutes during which time the sodium bicarbonate decomposed and the rubber vulcanised to an ebonite. Rigid cellular materials having densities, in the case of formation 6,720 kgm$^3$ and, in the case of formulation 7,800 kg/m$^3$ are formed.

All percentages in this specification and claims are by weight of the total composition unless the contrary intention is specified.

We claim:

1. A process for the production of a cellular material by vulcanizing a mixture containing between 9 and 50% by weight of a mixture of a rubber together with vulcanizing agents to form an ebonite with the rubber, between 20% and 70 by weight of a coal digested in pitch, tar or tar oil, between 10% and 40% of a particular filler and a chemical blowing agent, whereby an ebonite structure is formed, so that, during the vulcanization, the chemical blowing agent decomposes or reacts to produce a gas, the viscosity of the composition during the production of the gas increasng whereby at least 25% by volume of closed cells are retained in the composition wherein the digested coal has a penetration converted to a Ring and Ball softening point of 85° C, of between 10 and about 45.

2. The process claimed in claim 1 in which the rubber is selected from natural rubber and synthetic rubbers, said synthetic rubber is being a homopolymer or copolymer of butadiene or isoprene.

3. The process claimed in claim 2 in which the synthetic rubber is a copolymer of butadiene or isoprene with acrylonitrile or styrene.

4. The process claimed in claim 2 in which the blowing agent is selected from sodium bicarbonate and ammonium bicarbonate and azo blowing agents.

5. The process claimed in claim 2 in which before being foamed the mixture is so mixed that all solids are dispersed and the bituminous material and the rubber are mutually dispersed.

6. The process claimed in claim 5 in which the mixture is introduced into the mould cavity of a closed mould, which mould is then heated whereby the blowing agent forms cells and the rubber is vulcanised.

7. The process claimed in claim 6 in which a cellular material is removed from the mould before complete vulcanisation and thereafter the vulcanisation is completed to form the ebonite structure.

8. A cellular plastics material containing between 20% and 70% by weight of coal digested in pitch, tar or tar oil, and between 9 and 50% by weight of an ebonite vulcanized rubber matrix and between 10% and 40% of a particulate filler and including at least 25% by volume of closed cells, in which the digested coal has a penetration, converted to a Ring and Ball softening point of 85° C, of between 10 and about 45.

9. The cellular plastics material claimed in claim 8 in which the ebonite matrix is derived from a natural rubber or a synthetic rubber, said synthetic rubber being homopolymer or copolymer of butadiene or isoprene.

10. The cellular plastics material claim in claim 9 including at least 60% by volume of cells.

* * * * *